United States Patent
Narayanan et al.

(10) Patent No.: US 9,995,905 B2
(45) Date of Patent: Jun. 12, 2018

(54) METHOD FOR CREATING A CAMERA CAPTURE EFFECT FROM USER SPACE IN A CAMERA CAPTURE SYSTEM

(71) Applicant: Samsung Electronics Co., Ltd., Suwon-si, Gyeonggi-do (KR)

(72) Inventors: Karthik Narayanan, Royapettah (IN); Bhupala Srivarma Chiranjeevi, Basavanagar (IN); Gounyoung Kim, Seongnam-si (KR); Santhosh Kumar Banadakoppa Narayanaswamy, Bangalore (IN); Deepanshu Pattanayak, Kharagpur (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 15/034,090

(22) PCT Filed: Nov. 7, 2014

(86) PCT No.: PCT/KR2014/010694
§ 371 (c)(1),
(2) Date: May 3, 2016

(87) PCT Pub. No.: WO2015/069063
PCT Pub. Date: May 14, 2015

(65) Prior Publication Data
US 2016/0266348 A1 Sep. 15, 2016

(30) Foreign Application Priority Data

Nov. 7, 2013 (IN) .......................... 5022/CHE/2013
Oct. 9, 2014 (IN) .......................... 5022/CHE/2013

(51) Int. Cl.
*G02B 7/38* (2006.01)
*H04N 5/232* (2006.01)
(Continued)

(52) U.S. Cl.
CPC ................. *G02B 7/38* (2013.01); *G02B 7/36* (2013.01); *G06T 5/003* (2013.01); *H04N 5/2355* (2013.01);
(Continued)

(58) Field of Classification Search
CPC .. G02B 7/38; G02B 7/36; G06T 5/003; G06T 2207/10152; H04N 5/23212;
(Continued)

(56) References Cited

U.S. PATENT DOCUMENTS 5,589,908 A * 12/1996 Irie ........................ G02B 7/102
396/51
6,351,556 B1 2/2002 Loui et al.
(Continued)

*Primary Examiner* — Luong T Nguyen
(74) *Attorney, Agent, or Firm* — Jefferson IP Law, LLP

(57) ABSTRACT

The various embodiments of the present invention disclose an image processing method and system for capturing a refocusable image set. The method comprises of segmenting a field of view into a plurality of grids, determining a sharpness level associated with each of the plurality of grids, identifying one or more regions based on the determined sharpness level of each of the plurality of grids, each region comprising one or more of the plurality of grids and capturing an image associated with each of the identified one or more regions to form the refocusable image set. The method further comprises of detecting a refocusing action on an object, in the field of view, having an associated illumination level and varying the associated illumination level of the object based on the detection.

23 Claims, 9 Drawing Sheets

(51) Int. Cl.
  *H04N 5/235* (2006.01)
  *G06T 5/00* (2006.01)
  *G02B 7/36* (2006.01)
(52) U.S. Cl.
  CPC ....... *H04N 5/2356* (2013.01); *H04N 5/23212* (2013.01); *H04N 5/23232* (2013.01); *H04N 5/23238* (2013.01); *G06T 2207/10152* (2013.01)
(58) Field of Classification Search
  CPC ........... H04N 5/23232; H04N 5/23238; H04N 5/2355; H04N 5/2356; H04N 5/235
  See application file for complete search history.

(56) References Cited

U.S. PATENT DOCUMENTS

| | | | |
|---|---|---|---|
| 8,279,325 B2 | 10/2012 | Pitts et al. | |
| 2004/0017505 A1* | 1/2004 | Yamauchi | H04N 1/02815 348/370 |
| 2006/0153471 A1* | 7/2006 | Lim | H04N 5/23212 382/255 |
| 2006/0245665 A1 | 11/2006 | Lee et al. | |
| 2007/0217707 A1* | 9/2007 | Lin | H04N 5/23212 382/274 |
| 2009/0019375 A1* | 1/2009 | Garofalo | G06Q 10/06398 715/753 |
| 2009/0109304 A1* | 4/2009 | Guan | H04N 5/23212 348/240.99 |
| 2009/0213239 A1 | 8/2009 | Yoshida | |
| 2010/0097444 A1 | 4/2010 | Lablans | |
| 2011/0294544 A1 | 12/2011 | Liang et al. | |
| 2012/0242852 A1 | 9/2012 | Hayward et al. | |
| 2012/0249819 A1 | 10/2012 | Imai | |
| 2012/0321211 A1 | 12/2012 | Tsukagoshi et al. | |
| 2013/0028520 A1* | 1/2013 | Kondo | G06T 7/0048 382/195 |
| 2013/0033608 A1 | 2/2013 | Hong | |
| 2014/0013273 A1* | 1/2014 | Ng | G06T 5/50 715/802 |
| 2014/0085507 A1* | 3/2014 | Pillman | G06T 5/004 348/231.99 |
| 2014/0267833 A1* | 9/2014 | Chen | G06T 5/003 348/239 |
| 2015/0163406 A1* | 6/2015 | Laroia | G02B 27/58 348/208.1 |

* cited by examiner

[Fig. 1]
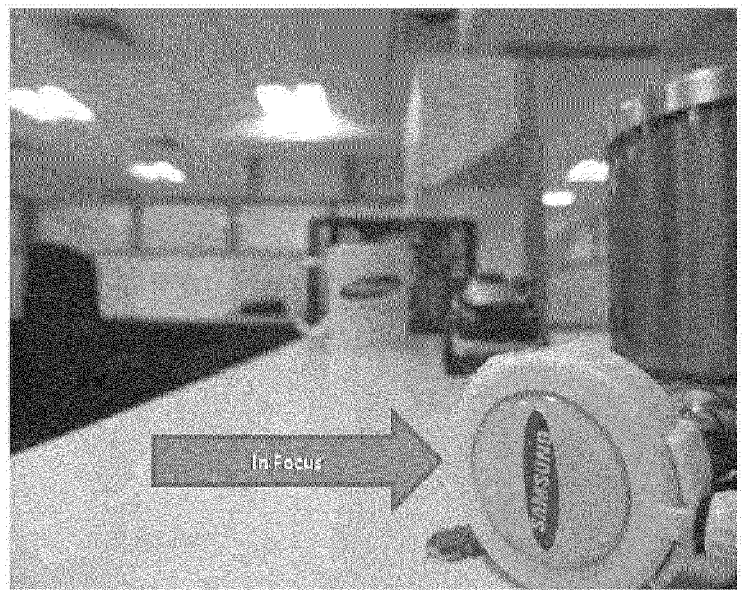

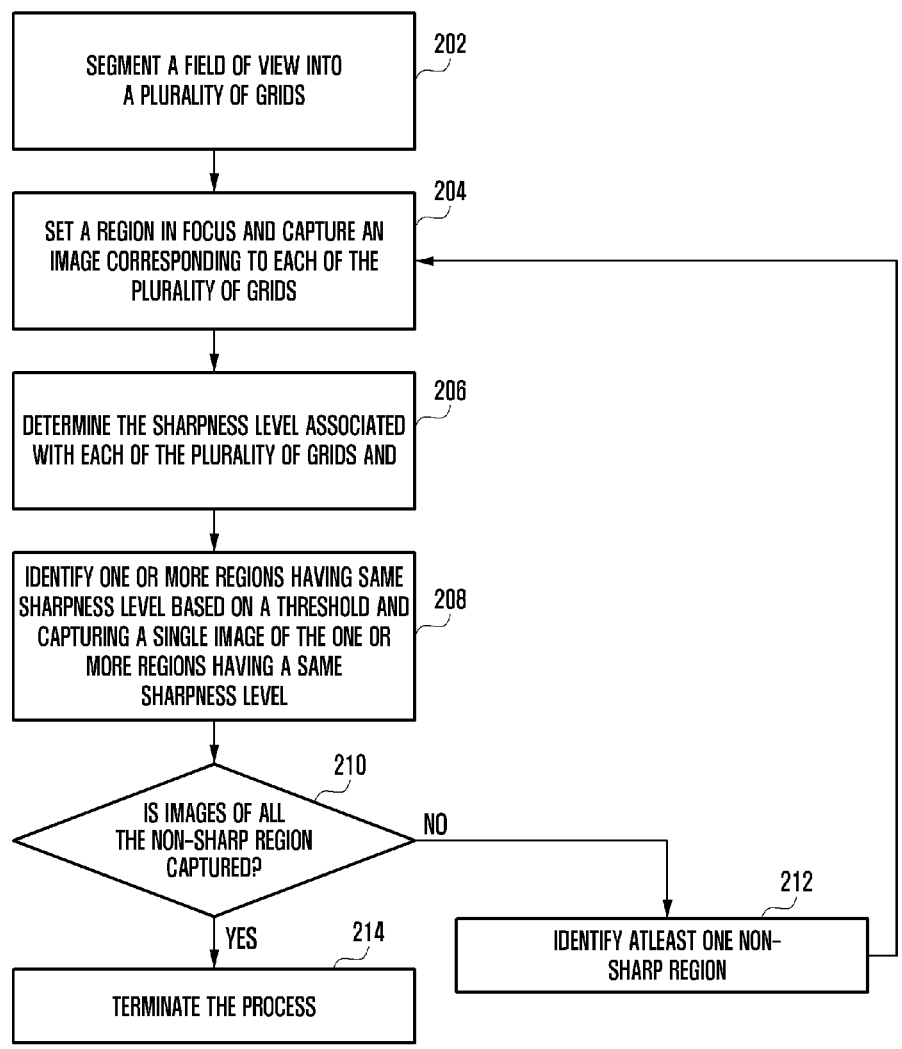
[Fig. 2]

[Fig. 3]
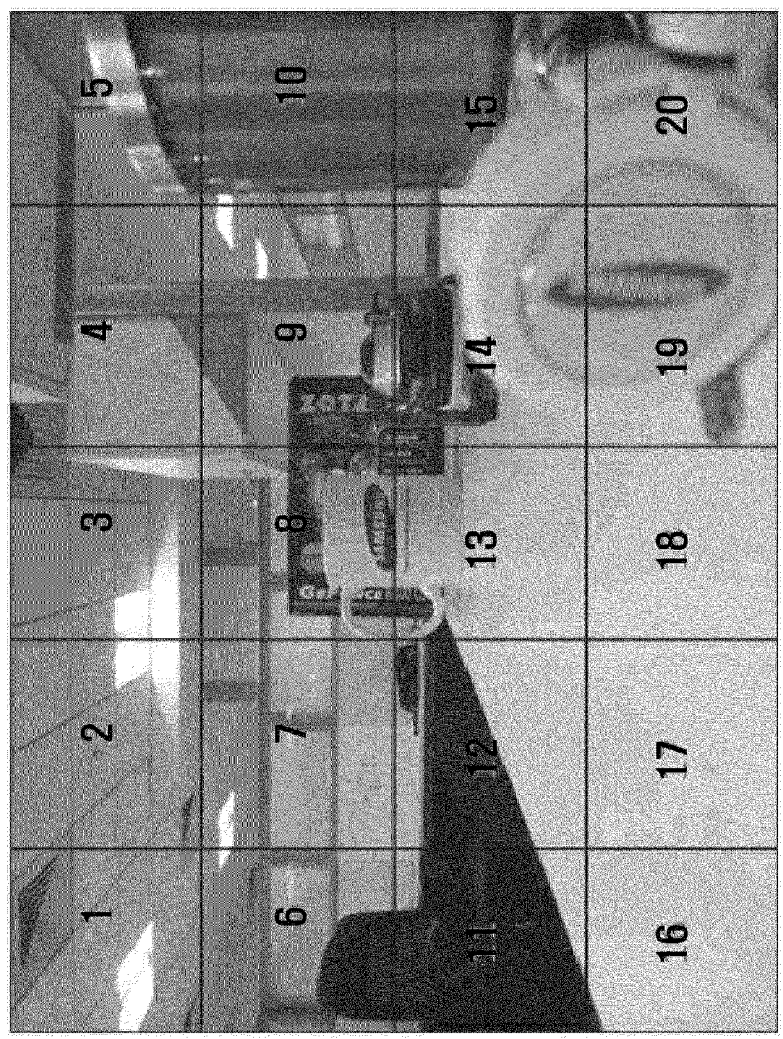

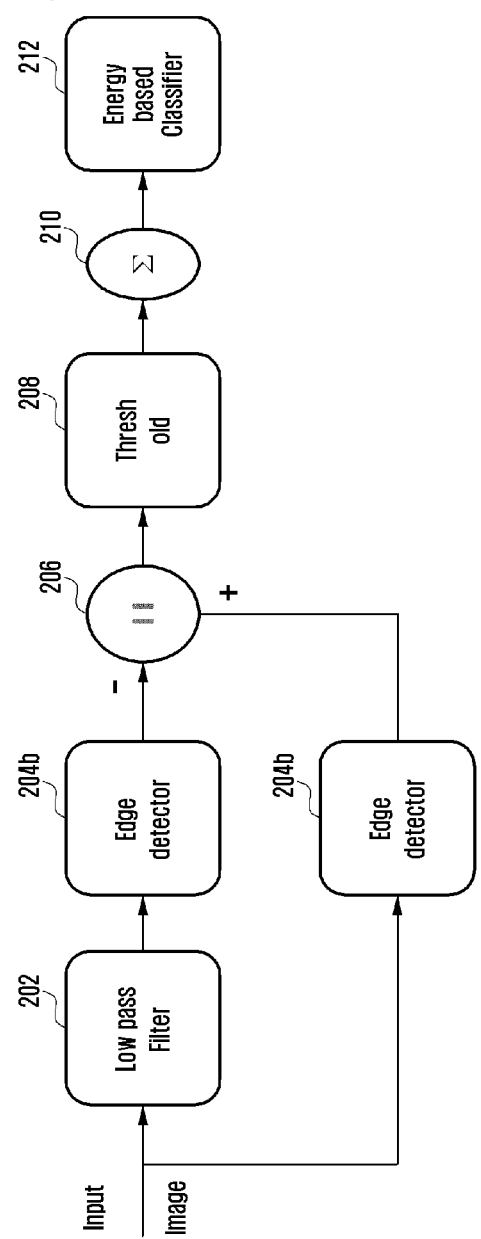

[Fig. 5]
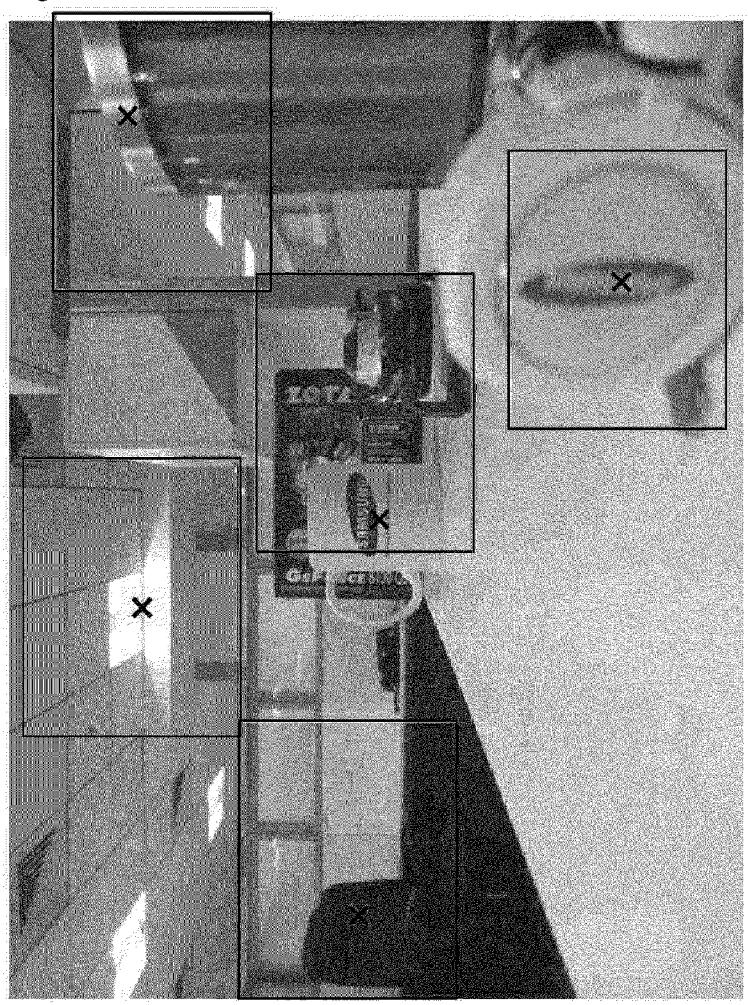

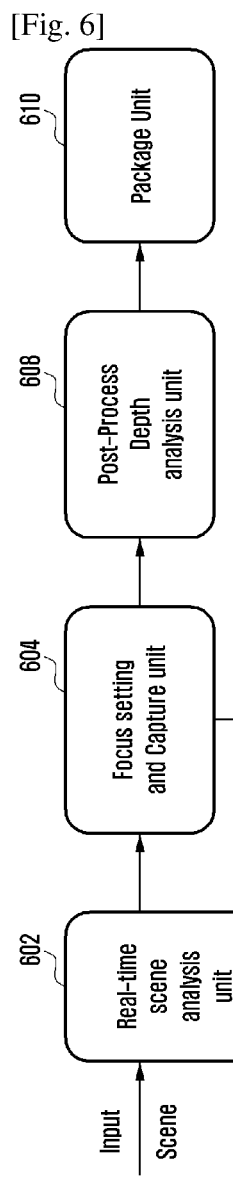
[Fig. 6]

[Fig. 7]

[Fig. 8]

[Fig. 9]
(a)
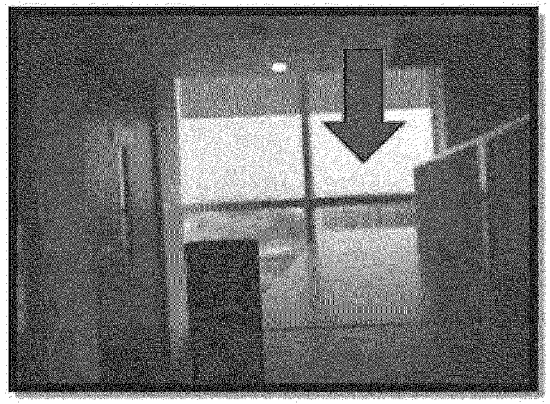
(b)

METHOD FOR CREATING A CAMERA CAPTURE EFFECT FROM USER SPACE IN A CAMERA CAPTURE SYSTEM

TECHNICAL FIELD

The present invention generally relates to image processing systems and methods and particularly to digital cameras that employ a plenoptic imaging method and system for creating a refocusable effect after capturing the image.

BACKGROUND ART

Light field cameras or plenoptic cameras are ones that use an array of micro lenses to capture 4-dimensional light field information about a scene. This method of capture gathers a lot of information about the scene that a variety of computer vision and graphics applications can exploit. One such technique or effect presently rolled out by commercial plenoptic cameras is the ability to refocus an image that is already shot. Incidentally, the refocus effect as illustrated in FIG. 1 appears to be the sole selling point in contemporary commercial light field cameras. Alternatively light field cameras offer end-users the ability to shoot a given scene and then refocus into regions of their interest.

While the visual impact of the refocus effect is quite significant and it completely disrupts the photo shooting paradigm from a consumer's perspective, the means does not justify the ends. The refocus effect produced by these light field cameras that allows users to "shoot-now-and-focus-later", as a key commercial aspect, does not necessarily require a plenoptic setup to be created. In other words, the same refocus effect can be simulated without using a plenoptic camera, i.e. by using a regular capture device like a digital camera.

Light field cameras offer end-users the ability to shoot a given scene and then refocus into regions of their interest. All solutions that provide this ability to refocus either require dedicated light field cameras or special auxiliary hardware or some form of hardware integration or manipulation. Further, such solutions are expensive and are not compatible with existing image capture devices/cameras and a new device or array of lenses/sensors would be required essentially to produce this refocus effect.

Although there have been attempts to simulate the refocus effect by using techniques that require some form of additional hardware, hardware add-ons or obtaining information from lower layer hardware devices (such as sensors) might not always be available. All these again compromise on cost or device compatibility. Any hardware solution or one that seeks hardware/sensor level information will be tied to a particular device or model. This would again necessitate the user to purchase that device or add-on to achieve the required refocus effect.

The foregoing examples of the related art and limitations related therewith are intended to be illustrative and not exclusive. Other limitations of the related art will become apparent upon reading of the specification and a study of the drawings.

DISCLOSURE OF INVENTION

Solution to Problem

The various embodiments herein provide a method and apparatus for capturing a refocusable image set. The method includes segmenting a field of view into a plurality of grids, determining a sharpness level associated with each of the plurality of grids, identifying one or more regions based on the determined sharpness level of each of the plurality of grids, each region comprising one or more of the plurality of grids and capturing an image associated with each of the identified one or more regions to form the refocusable image set.

According to an embodiment of the present invention, the method for capturing a refocusable image set further comprises of detecting a refocusing action on an object, in the field of view, having an associated illumination level and varying the associated illumination level of the object based on the detection.

According to an embodiment of the present invention, a refocus effect is defined as a process where the user can selectively choose the region the user wants to focus after the image has been captured. Further, the scene herein is defined as field of view intended to be captured as a picture by the user.

According to an embodiment of the present invention, the method further comprises of capturing the refocusable image set in a panoramic mode. In the panoramic mode, each object, associated with the field of view, can be individually focused in the captured refocusable image set in the panoramic mode.

According to an embodiment of the present invention, the method for capturing a refocusable image set further comprises of capturing the refocusable image set in a High Dynamic Range (HDR) mode, wherein each object associated with the field of view, can be individually focused in the captured refocusable image set in the HDR mode.

According to an embodiment of the present invention, the method for capturing a refocusable image set further comprises of capturing the refocusable image set from a plurality of positions to render the captured refocusable image set in a three-dimensional (3-D) mode, wherein each object associated with the field of view, can be individually focused in the captured refocusable image set in the 3-D mode.

According to an embodiment of the present invention, the method for capturing a refocusable image set further comprises of storing the refocusable image set in a predefined format such as one of a BSR file format, a multimedia container format, or an archiving file format with an associated metadata.

According to an embodiment of the present invention, the method for capturing a refocusable image set further comprises of segmenting a field of view into a plurality of grids, each grid associated with one or more objects present in the field of view, determining a sharpness level associated with each of the plurality of grids, identifying one or more regions based on the determined sharpness level of each of the plurality of grids, each region comprising one or more of the plurality of grids, and capturing an image associated with each of the identified one or more regions to form the refocusable image set, wherein each identified region has a varying sharpness level.

According to an embodiment herein, capturing an image of each region comprises of setting focus on a chosen region, calculate the sharpness level of the one or more regions, identify one or more regions which are sharp based on a threshold, not taking the images of the regions which are marked as sharp and proceeding with capturing images of a plurality of non-sharp regions until images are captured for each of the plurality of non-sharp regions.

According to an embodiment of the present invention, the method for capturing a refocusable image set further comprises of detecting a refocusing action on an object, in the field of view, having an associated illumination level and varying the associated illumination level of the object based on the detection.

According to an embodiment of the present invention, the method for capturing a refocusable image set further comprises of capturing the refocusable image set in a panoramic mode, wherein each object, associated with the field of view, can be individually focused in the captured refocusable image set in the panoramic mode.

According to an embodiment of the present invention, the method for capturing a refocusable image set further comprises of capturing the refocusable image set in a High Dynamic Range (HDR) mode, wherein each object associated with the field of view, can be individually focused in the captured refocusable image set in the HDR mode.

According to an embodiment of the present invention, the method for capturing a refocusable image set further comprises of capturing the refocusable image set from a plurality of positions to render the captured refocusable image set in a three-dimensional (3-D) mode, wherein each object associated with the field of view, can be individually focused in the captured refocusable image set in the 3-D mode.

Embodiments herein further provide an imaging apparatus for capturing a refocusable image set, the apparatus comprising an image capturing unit adapted for capturing images of a scene of interest and an image processing unit adapted for segmenting a field of view into a plurality of grids, determining a sharpness level associated with each of the plurality of grids, identifying one or more regions based on the determined sharpness level of each of the plurality of grids, each region comprising one or more of the plurality of grids, and capturing an image associated with each of the identified one or more regions to form the refocusable image set.

According to an embodiment of the present invention, the image processing unit is further adapted for detecting a refocusing action on an object, in the field of view, having an associated illumination level and varying the associated illumination level of the object based on the detection.

According to an embodiment of the present invention, the image processing unit is further adapted for capturing the refocusable image set in a panoramic mode, wherein each object, associated with the field of view, can be individually focused in the captured refocusable image set in the panoramic mode.

According to an embodiment of the present invention, the image processing unit is further adapted for segmenting the field of view into the plurality of grids, each grid associated with one or more objects present in the field of view, determining the sharpness level associated with each of the plurality of grids, identifying one or more regions based on the determined sharpness level of each of the plurality of grids, each region comprising one or more of the plurality of grids, and capturing an image associated with each of the identified one or more regions to form the refocusable image set.

According to an embodiment of the present invention, the image processing unit is further adapted for detecting a refocusing action on at least one object, in the field of view, having an associated illumination level and varying the associated illumination level of the object based on the detection.

According to an embodiment of the present invention, the image processing unit is further adapted for capturing the refocusable image set in a High Dynamic Range (HDR) mode, wherein each object associated with the field of view, can be individually focused in the captured refocusable image set in the HDR mode.

According to an embodiment of the present invention, the image processing unit is further adapted for capturing the refocusable image set from a plurality of positions to render the captured refocusable image set in a three-dimensional (3-D) mode, wherein each object associated with the field of view, can be individually focused in the captured refocusable image set in the 3-D mode.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

BRIEF DESCRIPTION OF DRAWINGS

The other objects, features and advantages will occur to those skilled in the art from the following description of the preferred embodiment and the accompanying drawings in which:

FIG. 1 is a snapshot of a captured image having varying region of focus for a same scene, according to a prior art illustration.

FIG. 2 is a flowchart depicting an exemplary method of capturing a refocusable image set, according to an embodiment of the present invention.

FIG. 3 is an illustration of an image depicting tiling the scene into contiguous blocks, according to an embodiment of the present invention.

FIG. 4 is a block diagram of an image processing system depicting shot optimization technique, according to an embodiment of the present invention.

FIG. 5 is snapshot illustrating an object based segmentation of the scene, according to an embodiment of the present invention.

FIG. 6 is block diagram of an image capture system, according to an embodiment of the present invention.

FIG. 7 is a snapshot of an image depicting refocus with varying illumination, according to an embodiment of the present invention.

FIG. 8 is a snapshot of an image depicting refocus in a panoramic mode, according to an exemplary embodiment of the present invention.

FIG. 9 is a snapshot of an image depicting HDR effect in refocus image, according to an embodiment of the present invention.

Although specific features of the present invention are shown in some drawings and not in others, this is done for convenience only as each feature may be combined with any or all of the other features in accordance with the present invention.

MODE FOR THE INVENTION

The present invention provides a method and system for capturing a refocusable image set. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Most of the image-capture devices available in the market today, i.e. cameras present in digital cameras, smartphones, tablets, are equipped with the ability to explicitly set the focus region before taking a picture. The present invention provides a touch to focus feature which is controlled from a user-space. This feature is a custom application. Also, the present invention provides a method of simulating the refocus effect by using a series of images capturing all of the scene's depth information. Thus, the present invention provides an image capturing method and system which exploits the fact that the touch-to-focus can be controlled from the user/application space and that the refocus can be simulated by captured number of shots of the same scene with each shot representing at least one region in the scene in focus. This capture system framework gets more robust when an optimal number of shots are captured that are sufficient to capture.

FIG. 2 is a flowchart depicting an exemplary process of capturing a refocusable image set by a capture system, according to an embodiment of the present invention. At step 202, segment a field of view into a plurality of grids. For example, when an input image is inputted to the capture system, the entire input image is segmented into a grid of M×N blocks. The choice of M×N can be configured by the user according to the requirements. In an exemplary embodiment, the values of M and N are determined based on a typical size of the objects present in the input image. Hence, in this case, the values of M×N would be 5×4. Next, a variable named "blockNum" is defined to indicate the block which would be explicitly set to focus. Initially, the value of blockNum is assumed to be one. At step 204, a given region is set on focus and an image corresponding to each region is captured. Further at step 206, a sharpness level associated with each of the plurality of grids are calculated. At step 208, identify one or more regions which are sharp based on a threshold and taking a single image of the one or more regions which are marked as sharp or having the same sharpness level. At step 210, verify if images of all the non-sharp regions are captured or not. If images of all the non-sharp regions are not captured, then identify at least one non-sharp region at step 212 and repeat the steps 204-210. Once the images corresponding to all the regions are captured, then terminate the process at step 214.

Hence, each block in the sequence has at least one image captured that has the image in focus. Thus, every block, and thereby every pixel in that block is uniquely mapped to the best focus image corresponding to the specific block among the sequence of images captured.

According to an embodiment herein, if autofocus in the imaging apparatus fails for one or more regions of the image, optional post processing is provided for creating the autofocus effect. Depending on the need of the user, the camera capture system also performs preprocessing of the image to determine the other blocks in focus using a shot optimization technique. The shot optimization technique reduces the number of pictures required to be captured per scene. This in turn reduces the capture time, thereby enhancing the user experience.

The shot optimization technique works on a per image basis. Further, the shot optimization technique provides information on all other regions in an image that are in the same depth plane. For instance, when a region is explicitly set to focus, the shot optimization technique provides information on all other regions in the scene that are also in focus. Hence, the shot optimization technique prevents another images being captured for those regions again explicitly, thereby creating an optimal number of pictures depicting the scene. From a refocus perspective, the shot optimization technique translates to each region in the sequence having at least one image which is completely in focus.

Upon capturing images associated with each of the identified one or more regions, the user can also perform a post processing depth estimation process on the captured images using a best in focus estimation from the captured sequence technique. According to an embodiment of the present invention, the best in focus estimation from the captured sequence method ascertains the image that provides the best focus among the set of images already captured. This technique is employed to better the depth map required for refocus. The method accurately assigns a unique image in the sequence captured to every pixel in the scene in which the pixel is in focus. It also accounts for regions where the camera auto focus might have failed and thus would not have a reliable focal estimate.

At step 210, the images captured are packaged along with the depth information in a single multimedia file format. The multimedia file format corresponds to any file format as desired by the user. For example, the multimedia file format corresponds to a burst shot refocus (BSR) format.

FIG. 3 is an illustration of an image depicting tiling the scene into contiguous blocks, according to an embodiment of the present invention. As shown in FIG. 3, a frame of the entire scene which a user wishes to capture is divided into an M×N grid of blocks. The M×N is estimated to be the typical size of objects encountered. In this case, the M×N is estimated to 5×4 based on the typical size of the objects encountered while capturing the scene. After dividing the entire scene into M×N grids of blocks, each grid is assigned a number based on the location of the grid Upon assigning the numbers to each of the grids of the M×N block, each grid (or also referred to as block) is focused separately to get the depth level for each grid using an autofocus feature. The one or more grids which are at the same depth level are identified and are captured in a single shot covering all the grids in focus. For example, grid 8 and grid 9 are in the same depth plane and thus are represented by a single image instead of two separate images. The single image consists of an object in grid 8 as well as the object in grid 9 in focus. Further, additional shots are taken for the other blocks and the images are combined to get a re-focusable image. On the other hand, if it is determined that the each grid of the M×N block are at different depth levels and no two grids are at the same depth level, then each grid is captured separately and M×N images are generated respectively.

The embodiments herein aims to reduce the number of shots based on the assumption that most natural sequences have more than one (of the M×N blocks) block in the same depth plane.

According to another embodiment, the present invention provides a depth estimation technique referred as best in focus estimation from the captured scene. Each region of the M×N block and the pixels of the M×N block covering the entire scene which the user wants to capture would have to be uniquely mapped to a single image in the sequence of images captured to describe the scene. It is possible that a region (of the M×N block) might not be in focus due to any alteration of the capture device or having two objects at varying depths. In such cases, the image captured with a particular block set in focus cannot be assumed to be an accurate one to recreate refocus effect. For instance, block 14 has two objects, namely, a toy car in focus and a portion of a key chain that is clearly out of focus. Thus, if one were to rely only on the region set in focus by the capture system in the previous sections, then the image would be tagged as the image which has that portion of the key chain in focus. But it is obvious that the image corresponding to region 20 in focus would be more accurate to represent these regions.

Further a focus estimation provided herein assumes that the sequence of images captured have all the information to choose at least one image to be in focus for any given region. It has been always a challenge to render a sharpest (best in focus) image for a region under consideration when a set of images are provided. The region under consideration is different from the regions mentioned in the previous sections. Typically, the region under consideration is determined based on the mode of user interaction that is desired. For example, if the user were to operate the refocus application using a touch-interface, the region under consideration would correspond to an average area of interaction using the touch interface. A user using the refocus application with a mouse based interface would have an even finer area of interaction and thus the region under consideration would have to be smaller. The best in focus estimation technique presented here takes into consideration all these factors and presents a configurable solution. The steps involved in this performing the best in focus estimation is described as follows.

Firstly, an edge map $I^j$ for all the images are obtained using any edge detection operation, where jH[1,N]. For example, one such edge detection operation can be the Laplacian of Gaussian filtering technique. Secondly, the edge image $I_j$ is divided into blocks of size p×q pixels each. Let there be R regions in the image. Then, the region under consideration r=1 are set. Next, the first order energy for a given region r, is calculated for each image. Later, the image which has the highest energy for a given region is chosen for the depth index for that region ($\mu_r$).

$$\mu_r = \underset{j}{\operatorname{argmax}} QI_r^j$$

Then, the region of consideration is incremented by one, i.e. r=r+1. The value of r is determined every time it is incremented to check whether r is equal to R, i.e, the total regions in the image. If the value of r is less than or equal to R then the process is routed to the previous step of calculating the first order energy for the region r+1 until the depth index is calculated for all the regions R in the image. This technique would thus provide an image index for every region in the image that would have that region in focus.

FIG. 4 is a block diagram of an image processing system depicting shot optimization technique, according to an embodiment of the present invention. The embodiments herein addresses the problem of detecting focus in an image by exploiting the fact that a blurry region is typically devoid of high frequency components and is thus insensitive to subsequent low pass filtering when compared to a sharp region. Here edge maps obtained from the original image and a heavily low pass filtered version of the image is compared using a sum of absolute differences. Further, the selective thresholding provides the region that is distinctly in focus. According to FIG. 4, a luma component of an input image is inputted to a low pass filter 402. The input image is filtered and the output of the low pass filter 402 is inputted to an edge detector 404a. The edge detector 404a produces an edge map: $I_{edge}^{LPF}$ corresponding to the low pass filtered version. Additionally, the input image is also fed to another edge detector 404b directly to obtain an edge map $I_{edge}$ corresponding to the input image. The two edge maps $I_{edge}$ and $I_{edge}^{LPF}$ corresponding to the input image and the low pass filtered image respectively are inputted to a binary unit 406. The binary unit 406 produces a binary map, $I^{bin}$, from the normalized sum of absolute difference between $I_{edge}$ and $I_{edge}^{LPF}$, where, $$I^{bin}(x, y) = \begin{cases} 1, & |I_{edge}(x, y) - I_{edge}^{LPF}| > \{\max(|I_{edge} - I_{edge}^{LPF}|)\}/\varepsilon_{th} \\ 0, & \text{otherwise} \end{cases} \quad 1$$

In the above equation, indices (x,y) represent the pixels in the image and $\varepsilon_{th}$ represents a threshold factor (empirically set as 5). The sum energy in each of the regions or blocks as defined in the previous section of the binary image $I^{bin}$, is calculated and those below or above a certain threshold $\delta_{th}$ are declared as region in focus by the threshold unit 408. The threshold was empirically determined for ensuring that false positives do not occur. This is given by equation 2:

$$I^{bin}(\text{region}) = \begin{cases} InFocus, & QQ \\ NotinFocus, & \text{otherwise} \end{cases} \quad 2$$

$$I^{bin}(\text{region}) > \delta_{th}$$

In an embodiment of the present invention, a miss in focussed region detection is acceptable but a false positive is not. In other words, it would be fine to miss detecting a region in focus but to classify a region that is not in focus as one in focus could lead to losing data. It is possible that none of the images captured to describe the scene have a particular region in focus which is detrimental from a refocus perspective. On the other hand, if the regions are contained with strong relative edges then the misses are assumed to be acceptable.

In an embodiment of the present invention, the capture system provides another method for estimating best in focus images from a captured sequence. In this method, at step 1, entire scene is split into M×N grid of blocks. The value of M and N are configurable. A reasonable estimate would be the typical; size of objects encountered, thus M=5 and N=4 empirically appeared to be a reasonable choice. At step two, blockNum is set to one where blockNum signifies the block which would be explicitly set to focus. At step three, α is considered to depict the regions in focus and α is set to NULL. At step four, block corresponding blockNum is set in focus and a picture of that block is captured. At step five, pre-processing of the captured block is performed to determine the other blocks in focus using shot optimization technique as mentioned above. And α is updated with all the regions detected to be in focus. At step six, blockNum is set as blockNum+1. At step seven, it is determined whether the blockNum is a part of block α. If yes, then it indicates that the blockNum is already in focus and the process is jumped to step six. If not, then at step eight, it is determined whether the blockNum is lesser than or equal to M*N. If yes, then the process is jumped to step three. If not, then at step nine, post processing depth estimation of the captured image is performed. At step ten, the images captured are packaged along with the depth information in the multimedia file format.

FIG. 5 is snapshot illustrating an object based segmentation of the scene, according to an embodiment of the present invention. With this method, a quick scene scan technique is employed to detect the most salient objects in the scene. Here, random overlapping blocks are sufficient to capture all the salient objects in the scene. The method of saliency detection is being widely defined in image processing literature. When the most salient regions of a given image are identified, the camera capture application is set to focus on each of these objects explicitly and a shot is taken for each of these objects. According to FIG. 5, the blocks comprising the objects which the user wants to capture are marked with an X mark. These blocks correspond to the salient regions of the image shown in figure. Hence, each of these blocks are set to focus and a shot is captured for each of these regions. Here, there are five blocks corresponding to salient regions, thereby obtaining 5 images containing the objects of with the user interest in focus.

FIG. 6 is block diagram of an image capture system, according to an embodiment of the present invention. According to FIG. 6, an input scene is inputted into a real time scene analysis unit 602. The real time scene analysis unit 602 segments the entire scene of the input image into an M×N grid of blocks and sets blockNum equal to one. This corresponds to the output of the real time scene analysis unit 602. The blockNum signifies the block which would be explicitly set to focus. The output of the real time scene analysis unit 602 is fed into a focus setting and capture unit 604 where the focus setting and capture unit 604 obtains the segmented M×N grid of blocks along with blockNum=1. The focus setting and capture unit 604 then sets the block corresponding to blockNum in focus and takes a picture. Then the focus setting and capture unit 604 performs preprocessing to determine the other blocks in focus using shot optimization technique as described above. The output of the focus setting and capture unit 604 is fed to the focus update unit 606. The focus update unit 606 checks if the block corresponding to the blockNum is already in focus. If yes, then the focus update unit 606 increments the value of the blockNum by 1. Then, the value of blockNum is determined to check whether it is less than or equal to the value of M*N. If the blockNum is determined to be less than or equal to the value of M*N, then the corresponding block is set to focus and taken a picture. For example, consider that value of blockNum is 13 after the value of blockNum is incremented by 1. In such a case, it is determined whether the value of the blockNum<=M*N. Here, the value of M*N is 20. Hence, the value of the blockNum is less than the value of the M*N, i.e 13<20. Hence, the block 13 is set to focus and taken a picture. This process is carried out until all the blocks of the M×N grids of block are set to focus and taken a shot. Once all the blocks of the M×N grids are completed, then the output of the focus setting and capture unit 604 is fed to a post process depth analysis unit 608. The post process depth analysis unit 608 performs best in focus estimation from the captured scene as described above. Then, the output of the post process depth analysis unit 608 is fed to the package unit 610 where the images captured are packaged along with the depth information in a multimedia file format.

FIG. 7 is a snapshot of an image depicting refocus with varying illumination, according to an exemplary embodiment of the present invention. In FIG. 7, a refocusing action is detected on an object of interest, in the field of view, having an associated illumination level. Then, the associated illumination level of the object is varied based on the detection. The figure (a) illustrates an image where the focus is set to the window whereas the figure (b) illustrates an image where the focus is on the pillow. Here, both the window and the pillow are in the same depth level. Hence, the user is able to vary the illumination of a captured image to highlight the object of his interest.

FIG. 8 is a snapshot of an image depicting refocus in a panoramic mode, according to an exemplary embodiment of the present invention. In FIG. 8, the user takes a refocus shot based on a Shot Optimization Technique, where a refocusable image set is captured in a panoramic mode. Each object, associated with the field of view, can be individually focused in the captured e panoramic image. In this figure, the panoramic image include objects such as a marker, a mouse, a cable, and a CPU. The user can change the focus on any object of interest in the panoramic image. For example, the user can refocus on the pen or the cable or the monitor according to his interest. Also, the user can implement refocus so that each object can be individually focused on at a later stage.

FIG. 9 is a snapshot of an image depicting HDR effect in refocus image, according to an exemplary embodiment of the present invention. In FIG. 9, the refocusable image set is captured in a High Dynamic Range (HDR) mode, wherein each object associated with the field of view, can be individually focused in the captured refocusable image set in the HDR mode. In this mode, the camera captures 2-3 shots of each object like ERT board, window and so on at different exposure levels to give HDR effect. For example, the camera captures a first shot with both ERT board and the background building in focus and are at the same exposure level. In another embodiment, the camera then captures another shot where the ERT board is at a lower exposure level and the background building is at a high exposure level.

According to an exemplary embodiment, consider an image having brute force auto focus bracketing of 7×5. Hence, there are 35 blocks. To simulate refocus it needs to take 35 shots. Also, to simulate refocus and HDR it needs shots at different exposure for each block, thus requiring 105 shots. Using smart refocus capture, it only requires 5 shots per scene. Thus to recreate refocus with HDR effect we require 5×3, i.e. 15 shots in all. This can be further reduce accounting for illumination variation.

According to an embodiment of the present invention, the refocus with HDR effect can also be created by image capturing devices which does not have an exclusive HDR mode.

According to another embodiment, the present invention also provides a method for capturing the refocusable image set from a plurality of positions to render the captured refocusable image set in a three-dimensional (3-D) mode, wherein each object associated with the field of view, can be individually focused in the captured refocusable image set in the 3-D model.

The embodiments of the image capture system as discussed herein can be incorporated on most of the existing devices which feature cameras with autofocus ability. Being hardware agnostic provides the application with the ability of converting any existing camera into a light field like camera with respect to the refocus effect. The capture system herein provides a basic capture framework and various optimizations that can enhance the user experience from various perspectives, quality, time of capture, processing time and system resource requirements. The embodiments herein details all the cost effective techniques that can be employed to recreate the refocus effect.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, firmware, and/or software embodied in a machine readable medium. Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

The invention claimed is:

1. A method of capturing a refocusable image set, the method comprising:
   segmenting a field of view into a plurality of grids;
   determining a sharpness level associated with each of the plurality of grids;
   identifying one or more regions based on the determined sharpness level of each of the plurality of grids, wherein each region comprises one or more of the plurality of grids; and
   capturing an image associated with each of the identified one or more regions to form the refocusable image set.

2. The method of claim 1, further comprising:
   detecting a refocusing action on an object in the field of view, wherein the object comprises an associated illumination level; and
   varying the associated illumination level of the object based on the detection.

3. The method of claim 1, further comprising:
   capturing the refocusable image set in a panoramic mode, wherein an object associated with the field of view can be individually focused in the captured refocusable image set in the panoramic mode.

4. The method of claim 1, further comprising:
   capturing the refocusable image set in a high dynamic range (HDR) mode,
   wherein an object associated with the field of view can be individually focused in the captured refocusable image set in the HDR mode.

5. The method of claim 1, further comprising:
   capturing the refocusable image set from a plurality of positions to render the captured refocusable image set in a three-dimensional (3-D) mode,
   wherein an object associated with the field of view can be individually focused in the captured refocusable image set in the 3-D mode.

6. The method of claim 1, further comprising storing the refocusable image set as a one of a burst shot refocus (BSR) file format, a multimedia container format, and an archiving file format, with an associated metadata.

7. A method of capturing a refocusable image set, the method comprising:
   segmenting a field of view into a plurality of grids, wherein each grid is associated with one or more objects present in the field of view;
   determining a sharpness level associated with each of the plurality of grids;
   identifying one or more regions based on the determined sharpness level of each of the plurality of grids, wherein each region comprises one or more of the plurality of grids; and
   capturing an image associated with each of the identified one or more regions having different sharpness level to form the refocusable image set.

8. The method of claim 7, further comprising:
   detecting a refocusing action on an object in the field of view, wherein the object comprises an associated illumination level; and
   varying the associated illumination level of the object based on the detection.

9. The method of claim 8, further comprising:
   capturing the refocusable image set in a panoramic mode, wherein each object associated with the field of view can be individually focused in the captured refocusable image set in the panoramic mode.

10. The method of claim 7, further comprising:
    capturing the refocusable image set in a high dynamic range (HDR) mode,
    wherein each object associated with the field of view can be individually focused in the captured refocusable image set in the HDR mode.

11. The method of claim 7, further comprising:
    capturing the refocusable image set from a plurality of positions to render the captured refocusable image set in a three-dimensional (3-D) mode,
    wherein each object associated with the field of view can be individually focused in the captured refocusable image set in the 3-D mode.

12. An imaging apparatus for capturing a refocusable image set, the imaging apparatus comprising:
    an image capturer configured to capture images of a scene of interest; and
    at least one processor configured to:
      segment a field of view into a plurality of grids,
      determine a sharpness level associated with each of the plurality of grids,
      identify one or more regions based on the determined sharpness level of each of the plurality of grids, wherein each region comprises one or more of the plurality of grids, and
      capture an image associated with each of the identified one or more regions to form the refocusable image set.

13. The image processing apparatus of claim 12, wherein the at least one processor is further configured to:
    detect a refocusing action on an object in the field of view, wherein the object comprises an associated illumination level, and
    vary the associated illumination level of the object based on the detection.

14. The imaging apparatus of claim 12, wherein the at least one processor is further configured to:
    capture the refocusable image set in a panoramic mode,
    wherein an object associated with the field of view can be individually focused in the captured refocusable image set in the panoramic mode.

15. The imaging apparatus of claim 12, wherein the at least one processor is further configured to:
    detect a refocusing action on at least one object in the field of view, wherein the at least one object comprises an associated illumination level, and
    vary the associated illumination level of the at least one object based on the detection.

16. The imaging apparatus of claim 12, wherein the at least one processor is further configured to:
  capture the refocusable image set in a high dynamic range (HDR) mode,
  wherein an object associated with the field of view can be individually focused in the captured refocusable image set in the HDR mode.

17. The imaging apparatus of claim 12, wherein the at least one processor is further configured to:
  capture the refocusable image set from a plurality of positions to render the captured refocusable image set in a three-dimensional (3-D) mode,
  wherein an object associated with the field of view can be individually focused in the captured refocusable image set in the 3-D mode.

18. The method of claim 1, further comprising:
  separating the identified one or more regions; and
  capturing an image set from a plurality of depth levels associated with each of the separated one or more regions to form the refocusable image set.

19. The method of claim 1, further comprising:
  generating an image file using the refocusable image set based on a user selection.

20. A method of capturing a refocusable image set, the method comprising:
  segmenting a field of view into a plurality of grids;
  determining a sharpness level associated with each of the plurality of grids;
  identifying one or more regions based on the determined sharpness level of each of the plurality of grids, wherein each region comprises one or more of the plurality of grids;
  separating the identified one or more regions; and
  capturing an image set from a plurality of depth levels associated with each of the separated one or more regions to form the refocusable image set.

21. The method of claim 20, further comprising:
  generating an image file using the refocusable image set based on a user selection.

22. An imaging apparatus for capturing a refocusable image set, the apparatus comprising:
  an image capturer configured to capture images of a scene of interest; and
  at least one processor configured to:
    segment a field of view into a plurality of grids,
    determine a sharpness level associated with each of the plurality of grids,
    identify one or more regions based on the determined sharpness level of each of the plurality of grids, wherein each region comprises one or more of the plurality of grids,
    separate the identified one or more regions, and
    capture an image set from a plurality of depth levels associated with each of the separated one or more regions to form the refocusable image set.

23. The imaging apparatus of claim 22, wherein the at least one processor is further configured to:
  generate an image file using the refocusable image set based on a user selection.

* * * * *